United States Patent Office 3,437,606
Patented Apr. 8, 1969

3,437,606
DENSIFICATION OF BORIDE COMPOSITIONS
Robert A. Mercuri, Seven Hills, Ohio, assignor to Union Carbide Corporation, a corporation of New York
No Drawing. Filed Sept. 29, 1966, Ser. No. 583,088
Int. Cl. H01c *13/00;* H01b *1/06*
U.S. Cl. 252—520  6 Claims

ABSTRACT OF THE DISCLOSURE

Densification of hot pressed $ZrB_2$, $HfB_2$ and $TiB_2$ through the use of an additive selected from the group consisting of rare earth and alkaline earth hexaborides.

---

The present invention is directed to the densification of boride compositions. More particularly, the present invention is directed to the production of high density hot pressed articles formed of $HfB_2$, $ZrB_2$ and $TiB_2$.

The aforementioned materials, $HfB_2$, $ZrB_2$ and $TiB_2$ have considerable utility in compacted form as high temperature structural materials and can also be used effectively as current conductive elements in aluminum reduction cells.

However, with such materials, it is highly important that the compacted articles have a high density and consequently as low a porosity as possible so that when used in aluminum reduction cells, infiltration of molten aluminum, or of cryolite flux, into the pores of the current conducting element is minimized.

Moreover, from an industrial point of view, it is important that high densities be attainable at moderate processing temperatures and pressures, and without the requirement of excessively fine materials, so as to reduce operating costs and permit the use of conventional equipment.

It is therefore an object of the present invention to provide hot pressed articles formed of $HfB_2$, $ZrB_2$ and $TiB_2$ which have nearly theoretical density.

It is another object of the present invention to provide a relatively low temperature, low pressure method for densifying hot pressed articles of $HfB_2$, $ZrB_2$ and $TiB_2$.

Other objects will be apparent from the following description and claims.

In accordance with the present invention a hot pressed article having nearly theoretical density, e.g. at least 95% of theoretical density, is obtained by hot pressing a particulated mixture of metal diboride, $HfB_2$, $ZrB_2$ or $TiB_2$, with about 0.1% to about 5%, based on the total weight of the mixture, of rare earth or alkaline earth metal hexaboride. The alkaline earth metals herein noted are those arranged in Group II of the periodic table which appears at page 444 in the Handbook of Chemistry and Physics, Chemical Rubber Publishing Company, forty-second edition; the rare earth metals are identified as such at page 447 of the same publication.

In practicing a particular embodiment of the present invention, the metal diboride and hexaboride additive are milled together, for example in a porcelain ball mill, to obtain a blended particulated mixture on the order of 200 mesh and finer (U.S. Standard Series). After blending, the mixture is introduced into a conventional hot-pressing apparatus and hot pressed under a vacuum of less than about 1 mm. Hg at a temperature of about 1800° C. and a pressure of about 2000 p.s.i. until maximum densification is obtained, usually on the order of about 30 minutes. The pressing apparatus comprises a cylindrical graphite mold provided with graphite plungers and is heated inductively. The plungers are actuated by a water-cooled metal ram and the mold body is thermally insulated with graphite felt. The temperature of the mold during pressing is determined optically through an opening in the insulation and through a quartz envelope surrounding the apparatus.

In general a temperature range of about 1500 to 2000° C. and a pressure range of about 1000 to 6000 p.s.i. are suitable for mixtures in the size range of 200 mesh and finer.

The article obtained by following the foregoing procedure is characterized by remarkably high densities, e.g. 95% of theoretical and higher, not withstanding the use of rather moderate temperautres and pressures.

The following example will further illustrate the present invention.

Example I $ZrB_2$ material, passing a 325 mesh screen having an analysis of 98% Zr plus B was dry milled for 16 hours with different amounts of $LaB_6$ passing a 200 mesh screen to obtain a blended mixture. The milling equipment employed was a one pint porcelain ball mill.

Mixture samples were then hot pressed in a cylindrical graphite die at 1800° C. and 2000 p.s.i. for about 30 minutes under a vacuum of less than 1 mm. Hg to produce slugs 1 inch long and ¾ inch in diameter. The density of the slugs was measured and the results are shown in Table I.

TABLE I

| Sample | Additive | Percent additive | Actual density | Theoretical density | Percent theoretical density |
|---|---|---|---|---|---|
| 1 | $LaB_6$ | 0 | 5.38 | 6.09 | 88 |
| 2 | $LaB_6$ | 1 | 5.89 | 6.06 | 97.2 |
| 3 | $LaB_6$ | 3 | 5.77 | 5.99 | 96.4 |
| 4 | $LaB_6$ | 5 | 5.80 | 5.92 | 98.0 |

Similar tests were performed using $CaB_6$, $SrB_6$, $YB_6$ and $CeB_6$ as additives, and also using $ZrB_2$ as the metal diboride, with comparable results.

From the foregoing, it can be seen that the use of additives with metal diborides in accordance with the present invention at moderate temperatures and pressures provides for the production of highly densified hot pressed articles.

Particular advantages accompanying this increased density are increased strength, sample integrity, thermal and electrical conductivity and lower porosity.

What is claimed is:

1. As an article of manufacture a hot pressed mixture having nearly theoretical density consisting essentially of at least one metal diboride selected from the group consisting of $ZrB_2$, $HfB_2$ and $TiB_2$ and from about 0.1% to about 5% in the aggregate of at least one additive material selected from the group consisting of rare earth and alkaline earth hexaborides.

2. An article in accordance with claim 1 wherein the selected diboride is $TiB_2$.

3. An article in accordance with claim 1 wherein the selected diboride is $HfB_2$ and the selected additive is $LaB_6$.

4. An article in accordance with claim 1 wherein the selected diboride is $HfB_2$ and the selected additive is $LaB_6$.

5. In the method of producing densified articles of $ZrB_2$, $HfB_2$ and $TiB_2$ by hot pressing, the improvement for providing the articles with increased density which comprises admixing with the material to be hot pressed, prior to hot pressing, between about 0.1% and about 5% of at least one material selected from the group consisting of rare earth and alkaline earth hexaborides.

6. An article in accordance with claim 1 wherein aggregate amount of additive material is from about 1 to 5%.

References Cited

UNITED STATES PATENTS

| 2,984,807 | 5/1961 | Blum | 338—330 |
| 3,003,885 | 10/1961 | Mandorf | 106—39 |

LEON D. ROSDOL, *Primary Examiner.*

J. D. WELSH, *Assistant Examiner.*

U.S. Cl. X.R.

106—55, 57, 65; 204—243, 291; 252—518, 521